US008702042B2

(12) United States Patent
Gerber et al.

(10) Patent No.: US 8,702,042 B2
(45) Date of Patent: Apr. 22, 2014

(54) FLOW BODY, IN PARTICULAR FOR AIRCRAFT

(75) Inventors: Martin Gerber, Bremen (DE); Geza Schrauf, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/441,944

(22) Filed: Apr. 9, 2012

(65) Prior Publication Data

US 2013/0025727 A1   Jan. 31, 2013

Related U.S. Application Data

(63) Continuation of application No. PCT/EP2010/006218, filed on Oct. 12, 2010.

(60) Provisional application No. 61/250,590, filed on Oct. 12, 2009.

(30) Foreign Application Priority Data

Oct. 12, 2009   (DE) .................. 10 2009 049 049

(51) Int. Cl.
*B64C 21/02*   (2006.01)
(52) U.S. Cl.
USPC .......... 244/209; 244/53 B; 244/204; 137/15.1
(58) Field of Classification Search
USPC ....... 244/53 B, 207–209, 198, 204; 137/15.1, 137/15.2
See application file for complete search history.

(56) References Cited

U.S. PATENT DOCUMENTS

| 2,585,676 A | * | 2/1952 | Philippe | 244/208 |
| 3,261,576 A | * | 7/1966 | Valyi, I | 244/130 |
| 4,666,104 A | | 5/1987 | Kelber | |
| 7,222,819 B1 | * | 5/2007 | Kelnhofer | 244/53 B |
| 2003/0150962 A1 | * | 8/2003 | Orban | 244/209 |
| 2010/0205975 A1 | * | 8/2010 | Cloft et al. | 60/772 |

FOREIGN PATENT DOCUMENTS

| EP | 0 955 235 A2 | 11/1999 |
| EP | 1 998 028 A2 | 12/2008 |
| WO | WO 2009/023354 A2 | 2/2009 |

OTHER PUBLICATIONS

International Search Report for Application Serial No. WO 2011/045027 dated Jul. 5, 2011.

* cited by examiner

*Primary Examiner* — Timothy D Collins
*Assistant Examiner* — Jamie S Stehle
(74) *Attorney, Agent, or Firm* — Jenkins, Wilson, Taylor & Hunt, P.A.

(57) ABSTRACT

A flow body is disclosed, particularly for aircraft. The flow body includes an outer side impinged on in a predetermined manner by a fluid in a direction of impinging flow, the flow body having on its outer side at least one flow control device including micro-perforations arranged in at least one segment of the outer side, at least one connecting passage communicated with the micro-perforations via at least one suction chamber so fluid flowing through the micro-perforations flows via the suction chamber into the connecting passage, at least one suction device having a first inlet communicated with the connecting passage, a second inlet communicated with at least one ram fluid feed line, wherein the ram fluid feed line is in a region of the flow body opposite to the direction of impinging flow of the flow body, and an outlet device for discharging the fluid.

12 Claims, 4 Drawing Sheets

FLOW BODY, IN PARTICULAR FOR AIRCRAFT

CROSS-REFERENCE TO RELATED APPLICATIONS

The present application is a continuation of International Application No. PCT/EP2010/006218, filed on Oct. 12, 2010, which claims priority from German Application DE 10 2009 049 049.3, filed on Oct. 12, 2009, and claims the benefit of U.S. Provisional application 61/250,590, filed on Oct. 12, 2009, each of which is hereby incorporated in its entirety by reference.

FIELD OF THE INVENTION

Embodiments of the invention relate to a flow body, in particular for aircraft, having an outer side. Embodiments of the invention in particular relate to a flow body having on its outer side at least one flow control device for influencing the flow of the fluid impinging on the flow body in a predetermined direction of impinging flow. The flow control device includes a plurality of intake openings arranged in at least one segment of the outer side, as well as a suction device whereby fluid flowing on the outer side may be sucked in, in order to improve the properties of the flow body in terms of flow mechanics.

BACKGROUND

In contemporary aircraft construction, components such as wings, engine nacelles, and empennages, or tail units, are used which are enveloped by a flow of surrounding air in flight operation. In principle, two different flow conditions manifest in the air flow enveloping the aircraft components. In the layers of flow further removed from the aircraft component there exists a frictionless outer flow, and in flow layers of the air flowing directly past the aircraft component there exists a boundary layer flow having a laminar and/or turbulent flow. Such boundary layer flows are mostly not turbulent over the entire length of the flow body or of the aircraft component but, when viewed in the direction of flow, initially generally present an area of laminar flow and then an area of turbulent flow, with the laminar area of flow being substantially smaller than the manifesting area of turbulent flow. In the case of commercial aircraft used in middle-range operation this distribution results in a frictional contribution of approx. 50% to the overall resistance of the aircraft. In order to reduce the air resistance, transition controls were proposed in the prior art whereby a component-specific preservation of the laminar boundary layer flow may be achieved with the aid of boundary layer suction.

Previous boundary layer suction systems make use of pump/compressor units for extraction of the boundary layer flowing around the flow body. Extraction is effected locally at components such as wing, engine nacelle, or vertical tail, wherein the electric energy to be expended for the operation of the pump/compressor units is furnished, e.g., via hydraulic systems while for example making use of driving fluid from the air-conditioning system of the aircraft for operating the pump. The pumps are connected via conduit systems to openings at the surface, for instance of a wing, in order to be able to extract the air mass flow.

The pump/compressor unit of the known suction systems must, however, be taken into account in the energy balance and also in the weight analysis of the aircraft and must inevitably be considered to be added expenditure. The additional weight introduced on board an aircraft by these systems and the added energy consumption result in a deteriorated efficiency of the aircraft.

SUMMARY

Various embodiments of the invention provide an apparatus of the kind mentioned at the outset, which presents a lowest possible total weight and a low energy demand.

In accordance with various embodiments of the invention, a flow body, in particular for aircraft, includes an outer side impinged on in a predetermined manner by a fluid in a direction of impinging flow, said flow body having on its outer side at least one flow control device including a plurality of micro-perforations that may be arranged at least at a segment of the outer side, at least one connection chamber or a connecting passage that may be communicated with the micro-perforations via at least one suction chamber so that fluid flowing through the micro-perforations may flow via at least one suction chamber into the connecting passage, at least one suction device having a first inlet which may be communicated with the connecting passage, a second inlet which may be communicated with at least one ram fluid feed line and which may in particular be the inlet of the ram fluid feed line. The ram fluid feed line is situated in a region of the flow body that is oriented opposite to the direction of impinging flow. Moreover the flow body includes an outlet device for discharging the fluid. The suction device is realized such that in predetermined flight ranges or flight states of the aircraft it is driven by fluid flowing into it through the ram fluid feed line, in such a way that this fluid is drawn off from the vicinity of the flow body through the micro-perforations. The ram fluid feed line and the suction device are realized such that the suction device is driven in a sufficient degree so as to suck in fluid through the perforations at a predetermined throughput. Such an arrangement fundamentally presents the advantage that owing to the component-specific linearization of the boundary layer a considerable reduction of the fuel consumption and of the polluting emissions of the commercial aircraft is achieved. In addition compared with a pump/compressor unit, the use of the suction device presents the advantage that on the one hand weight may be saved and on the other hand a board-side supply of electric energy is not required. The suction device is operated by the air from regions on the aircraft where ram air is present, or from regions close to these or where a sufficient pressure prevails, so that the suction device is supplied with pressurized air or ram air having a sufficient pressure and/or throughput. According to one practical example embodiment of the invention, fluid or air is introduced directly into the suction device from an area of the aircraft where ram air is present.

Moreover at least one orifice where a predetermined pressure drop of the sucked-in flow is obtained may be provided between the micro-perforations and the connecting passage.

With the aid of the orifice the suction device may be adapted to a multiplicity of different flight states, to then carry out a self-adjusting operation in the ranges of a flight state. In this practical example it may particularly be provided that the suction jet pump automatically adjusts itself to a predetermined suction power. In one development of an embodiment of the invention, the suction jet pump may be realized such that it automatically adjusts itself to a predetermined suction power as a function of the pressure of the fluid flowing into the ram fluid feed line or of the throughput of this fluid. The orifice may be arranged to be insertable and replaceable.

In addition, the ram fluid feed line communicates with an opening, wherein the opening may be arranged on the outside of the flow body in the area of a stagnation point of the flow body where the sum value of dynamic pressure and static pressure in the fluid impinging on the flow body has a maximum value. By means of such an arrangement it may be ensured in a particularly simple manner that the air mass flow required for operating the suction device will always be conducted in the ram fluid feed line at a maximum pressure or—depending on the respective flight conditions of the aircraft—at an average optimum pressure, whereby a secure operation of the suction device may be ensured inasmuch as the total pressure at the inlet of the supply line is greater than the total pressure prevailing at the micro-perforations. The opening of the ram fluid feed line does, however, not necessarily have to be located exactly in the stagnation point but may be provided in a surrounding region situated in the vicinity of the actual stagnation point. At the opening or in the surrounding region thereof, the fluid has a higher total pressure in comparison with the total pressure in other areas of flow of the fluid.

Moreover, fluid sucked in via the first inlet and/or the second inlet may be dischargeable from the suction device by means of the outlet device, i.e., may be removed via an outlet device. This results in the advantage that a construction having a particularly simple structure may be realized inasmuch as it is possible to do away with a plurality of individual outlet devices. In this case the airflows sucked in via the first and second inlets are blended together in the suction device and discharged jointly via a single, common outlet device.

Moreover the suction device may be a self-regulating suction jet pump, whereby it is possible to generate a constant pressure in the first inlet. This presents the advantage that the air impinging on the flow body is made use of as a driving fluid for driving the suction device, so that there is no need, e.g., to use the air-conditioning system fluid as a driving fluid.

Moreover the flow body may be an engine nacelle having a substantially cylindrical external configuration, with the longitudinal axis A of the engine nacelle running substantially in parallel with the direction of impinging flow F of the fluid, and/or the connecting passage extending around the longitudinal axis A in a circumferential direction.

Moreover the segment in the outer side having the flow control device arranged therein may extend at least partly in a circumferential direction and may extend in a longitudinal direction of the engine nacelle over a range of 0% to 50% of the surface starting from the stagnation point of the engine nacelle.

In an alternative embodiment of the invention, the flow body may be an airframe having an airframe chord direction, an airframe span wise direction, and an airframe thickness direction, with the connecting passage preferably extending along the airframe spanwise direction.

The meaning of the word "airframe" should in the following be understood in a generalized manner as a collective term encompassing a vertical tail, a horizontal tailplane, as well as any embodiments of airfoils or wings of an aircraft.

Moreover the segment may be disposed in the outer side in which the flow control device is arranged, may extend at least partly in the airframe spanwise direction, and may extend in the airframe chord direction over a range of 0% to 75% of the surface starting from the stagnation point of the airframe.

In the application of various embodiments of the invention to an aircraft, the fluid is the air impinging on the aircraft in its predetermined operational condition in the air. In this case the ram fluid feed line may in particular be termed a ram air feed line. Embodiments of the invention are, however, generally also applicable to ships. In that case the fluid is the water flowing along the ship.

What is in particular provided in accordance with various embodiments of the invention is a flow body (10), particularly for aircraft, including an outer shell (31) having a ram air region (F1) which is brought about, in the presence of a predetermined flow of a fluid enveloping the flow body (10) in a direction of impinging flow (F), in an enveloping flow region (F2) located to the rear of said ram air region at least during cruise conditions and when viewed in the direction of flow, and at least one flow control device (1) including:
 a plurality of micro-perforations (2) penetrating the outer shell (31), which are arranged in at least one segment (3) of the outer shell (31) that is situated in the enveloping flow region (F2);
 a plurality of suction chambers each adjoining the inside of the flow body (K) at the outer shell (31) thereof, wherein their upper walls (11a) are each part of or adjoin the outer skin such that the micro-perforations (2) extend inside the suction chambers, and their lower walls (11b) each present at least one orifice opening or a valve passage, with sidewalls of the suction chambers delimiting the inner spaces thereof from each other,
 at least one connecting passage (5) which is situated below the suction chambers (21) when viewed in the thickness direction of the flow body,
 at least one suction device (6) connected to the connecting passage (5) and including a first inlet opening (12a) for drawing in fluid having entered through the micro-perforations (2), which is communicated with the connecting passage (5).

The flow control device additionally includes a ram fluid feed line (11) which includes a ram fluid inlet opening (7) situated in the ram air region (F1). Moreover the suction device (6) includes a suction device housing (51) forming an evacuation chamber (60) and including the inlet opening (12b, 63) and an outlet opening (54), and a nozzle (60) including an inlet opening (12b, 63) to which the ram fluid feed line (11) is connected. The outlet opening is situated in the prolongation of the longitudinal direction (LD) of the nozzle (60). The suction device (6) is positioned in the flow body (10) such that the outlet opening (54), when viewed in the chord direction of the flow body (10), is situated in the range between 40% and 60% of the entire flow body chord.

According to one embodiment of the invention it is provided that the entire length of the suction device housing (51) extending in a chord direction of the flow body (10) is between 700 mm and 900 mm. Moreover it may be provided in accordance with one embodiment of the invention that the micro-perforations (2) have a diameter of between 10 μm and 1,000 μm.

The distance between two respective adjacent micro-perforations may in particular be between 0.1 mm and 2.5 mm.

According to one embodiment of the invention it is provided that the flow control device (1) is realized such that at the outlet opening (54) of the suction device housing (51) a fluid mass flow is present at which the fluid pressure at the outlet opening (54) is lowered to the ambient pressure of the flow body in the respective operational condition or to the negative pressure prevailing at the outer side thereof at the same chord position of the flow body, with a respective deviation of 20% at the most.

Moreover in one embodiment of the invention the ram fluid feed line (11) may merge into the flow body at an opening (7), with the opening (7) being arranged on the outside of the flow body such that in the absence of the opening the stagnation point of the flow body is situated within the opening when viewed in the direction of flow.

According to a further embodiment of the invention, the outlet device (9) may be connected to the mixing chamber and have the form of a diffusor which opens on the interior of the flow body, with the flow body having in its rear area, when viewed in the direction of flow, an outlet device through which air present in the interior (10a) of the flow body may escape to the surroundings of the flow body.

When embodiments of the flow body are employed as a part of an airframe, it may in particular be provided that the suction device housing (51) includes two inlet openings (52a, 52b) arranged so as to face each other, and that the flow body includes an outer shell having a first (F2) and a second (F3) enveloping flow region and a ram air region (F1) situated between these, with the outer sides of the first and second enveloping flow regions being situated opposite to each other.

BRIEF DESCRIPTION OF THE DRAWINGS

In the following, practical examples of embodiments of the invention shall be described by referring to the annexed schematic figures, wherein.

DESCRIPTION

Figure 1:
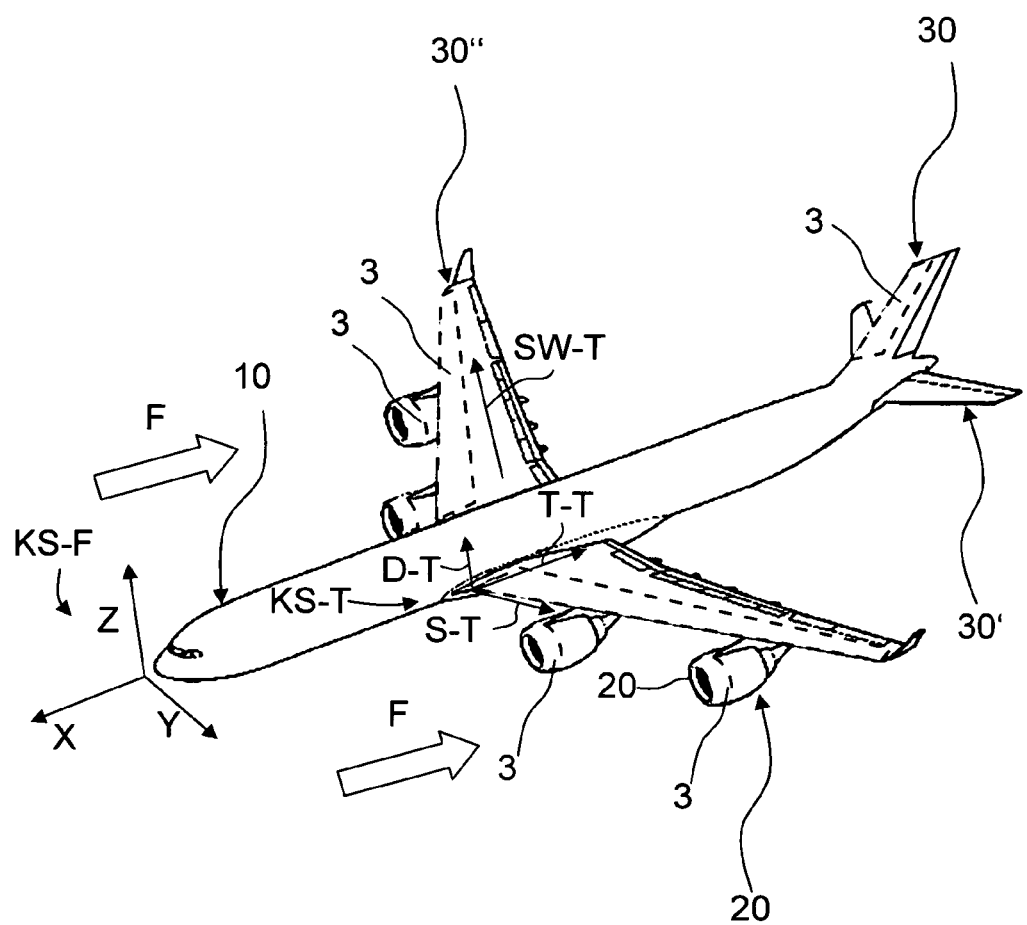
FIG. 1 is a perspective view of an aircraft having flow bodies provided in accordance with an embodiment of the invention.

In FIG. 1 an aircraft 10 is depicted in perspective representation, with flow bodies in accordance with an embodiment of the invention including, e.g., engine nacelles 20, the vertical tail 30, horizontal tailplanes 30', as well as the airfoils or wings 30". In FIG. 1 an aircraft-side fixed coordinate system is moreover specified, with the X-direction indicating an aircraft chord direction running from the aircraft's rear end to the aircraft's nose, with the Y-direction running along the wing spanwise direction, and with the Z-direction indicating an aircraft height direction. In FIG. 1 a coordinate system KS-T of a wing 30" of the aircraft 10 is furthermore drawn. As regards the vertical tail 30, the Y-direction points in a vertical tail thickness direction, and the Z-direction in a vertical tail spanwise direction.

The coordinate system KS-T of the wing T is a local coordinate system and consists of a spanwise direction S-T, a wing chord (chordwise) direction T-T, and a wing thickness direction D-T. In accordance with a definition according to various embodiments of the invention, the local coordinate system KS-T for the wing T is oriented such that the local wing chord direction FT runs in parallel with the longitudinal axis X of the aircraft coordinate system KS-F. The orientation of the axes and of the origin of the local coordinate system KS-T of the wing T may in particular furthermore be defined on the basis of the respective smallest cross-sectional surface area of the wing T resulting in any point of the wing T, with the origin of the local coordinate system KS-T being the centroid resulting for the respective cross-sectional surface area and situated in the latter, and the local wing thickness direction D-T as well as the local wing chord direction T-T being situated in the respective smallest cross-sectional surface area.

In accordance with an alternative definition according to various embodiments of the invention, the local coordinate system KS-T for the wing T is oriented such that the wing chord direction FT of the coordinate system KS-T of the wing T runs in the X-direction or longitudinal direction of the aircraft coordinate system KS-F, and that the wing thickness direction FD of the coordinate system KS-T of the wing T runs in the Z-direction of the aircraft coordinate system KS-F or in the direction of the vertical axis Z of the aircraft.

In particular the outer side of the outer shell may be defined such that its outer contour 31a has an angle of 30 degrees relative to the longitudinal axis A of the flow body 10 in any location of the region F2 in the chord direction T-B.

By way of example and in a non-restricting manner, segments 3 are specified on the vertical tail 30, the airfoils or wings 30", and on the engine nacelles 20, in which segments micro-perforations 2 or openings having a respective size in the order of micrometers, hereinafter also referred to as micro-perforation openings, are provided at a region or segment of the outer side or outer shell of the aircraft component. Such segments 3, in the following also referred to as regions 3, may however also be provided on the surfaces of the horizontal tailplanes 30" or on the surface of the outer side of the aircraft fuselage.

In the normal flight state the represented aircraft 10 moves relative to a fluid, in general atmospheric air, which impinges on the aircraft in a direction of impinging flow F in the predetermined flight states when using the aircraft 10 as a point of reference.

Figure 2:
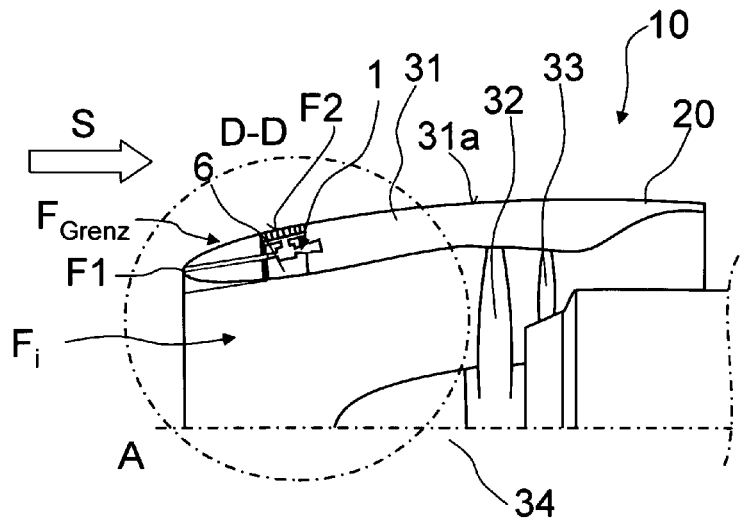
FIG. 2 is a sectional view of an engine nacelle as one example of a flow body in accordance with an embodiment of the invention.

In FIG. 2 a sectional view of an engine nacelle 20 of an embodiment of the invention is represented as an example of the flow body 10 of an embodiment of the invention. The engine nacelle 20 is shown in a sectional representation along its longitudinal axis A, with only the upper part of the sectional view being shown. The chord direction T-B of the flow body 10, which runs along the longitudinal axis, begins at the respective stagnation point. Here the engine nacelle 20 may present a substantially cylindrical external shape having a longitudinal axis A. "Substantially" should in this context be understood to the effect that the engine nacelle 20 may, e.g., have an axially symmetrical or also mirror-symmetrical shape, relative to the longitudinal axis A or to a plane containing the longitudinal axis A. The longitudinal axis A of the engine nacelle 20 may in particular also result from the line connecting the centroids of the cross-sectional surface areas surrounded by the outer surface. By way of example and in a non-restricting manner, the engine nacelle 20 represented schematically in FIGS. 2 and 3 has an outer side 31a which is connected to the hub 322 via a strut 33. The connecting strut 33 may at the same time be realized as a stator 33. A rotor 32 which may, by way of example and in a non-restricting manner, be the fan and/or a compressor vane wheel of the engine, is rotatably mounted on the hub 322. In the operating condition, i.e., when the aircraft is moving relative to the surrounding air, the air flows along the direction of impinging flow F toward the engine nacelle 20. In the process, a part of the flow flows into the inside of the engine nacelle 20 and is enriched with fuel in the turbine located inside the engine nacelle 20, so that oxygen contained in this air together with the fuel mixture is ignited later on in order to ensure the propulsion of the aircraft. This part of the flow is designated by $F_i$ in FIG. 2. A second part of the flow flows past the engine nacelle along the outer side 1 of the nacelle. A boundary layer designated by $F_{Grenz}$ in FIG. 2 forms in the described manner in the vicinity of the outer side 31*a*. A far smaller part of the flow impinges nearly perpendicularly on the front region of the engine nacelle and generally in the ram air region F1 of the flow body 10. The ram air region F1 is the one region on the outer side 31*a* of the flow body a flow control device 1 including a suction device 6 is provided.

The flow control device 1 of the various embodiments of the invention may, however, also be utilized in engine nacelles having a constructional structure that is different from the one presently shown.

In general the flow body 10 includes: an outer shell 31 having a ram air region F1 which is brought about, in the presence of a predetermined flow of a fluid enveloping the flow body 10 in a direction of impinging flow F, in an enveloping flow region F2 located to the rear of said ram air region at least during cruise conditions and when viewed in the direction of flow, and at least one flow control device 1.

Figure 3:
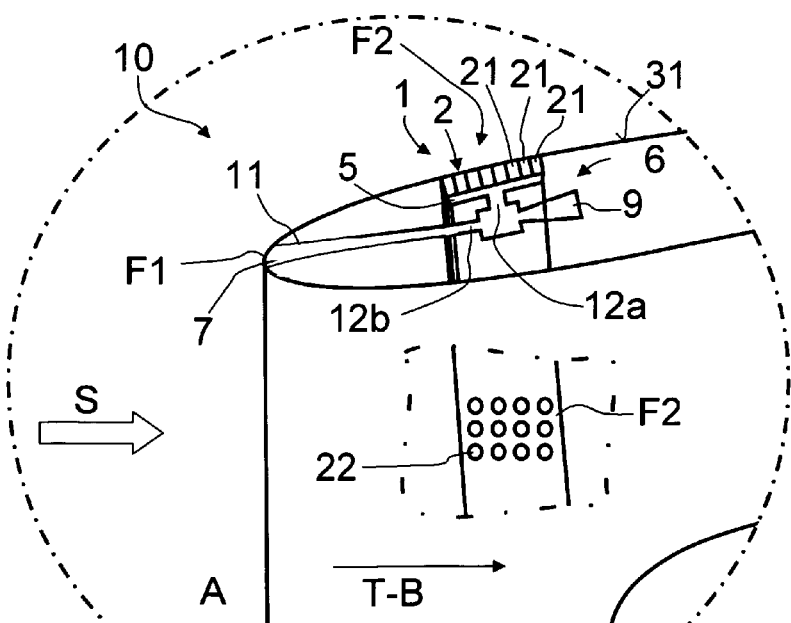
FIG. 3 shows an enlarged representation of the detail D-D from FIG. 2.

For the sake of clarity the detail D-D of FIG. 2 is shown in an enlarged representation in FIG. 3 so as to allow a better view in particular of the flow control device 1 and its constituent parts. In the following, the function of the flow control device 1 shall be explained while making reference to FIG. 3. As was already mentioned in the foregoing, the boundary layer flow $F_{Grenz}$ flows past the engine nacelle 20 along a surface of the outer side 31*a*. In the area of the outer side 31*a* a plurality of micro-perforations 2 are provided on the flow control device 1. Air from the boundary layer flow $F_{Grenz}$ may be sucked to the interior of the flow control device 1 through these micro-perforations 2. The micro-perforations 2 are fluidically communicated via suction chambers 21 with a connecting passage 5, so that in the presence of a corresponding pressure gradient, fluid flowing from the boundary layer $F_{Grenz}$ through the micro-perforations 2 is conducted through the suction chambers 21 into the connecting passage 5. The connecting passage 5 may also be may realized as a suction conduit or passage or, in the case of the engine nacelles 30, as an annular passage, so that these expressions should be understood to be synonyms within the meaning of the present invention.

The connecting passage 5 is moreover connected via a first inlet 12*a* to the suction device 6 or to a flow chamber 12*c* thereof. The suction device 6 additionally communicates via a second inlet 12*b* with a ram fluid feed line 11 which is connected via an opening 7 in the outer side to the surroundings of the engine nacelle 20. As may be taken from FIG. 3, the opening 7 is arranged in the vicinity of the stagnation point at which the air impinging on the engine is backed up such that the total pressure attains a maximum value. In other words, the stagnation point should in the following be understood to be the point at which the sum of static pressure and dynamic pressure is highest with regard to the pressure in the fluid that is present in the surroundings of the stagnation point. Owing to this total pressure, the fluid is conducted through the opening 7 into the ram fluid feed line 11 and thus passes through the suction device 6 and into an outlet device 9. During its passage through the suction device 6, the pressure difference creates a negative pressure in the first inlet 12*a* so that fluid is sucked from the connecting passage 5 into the suction device via the first inlet 12*a*. Accordingly, the negative pressure generated by means of the suction device 6 brings about a course of flow of the fluid from the boundary layer flow $F_{Grenz}$ through the micro-perforations 2 via the suction chambers 21 into the connecting passage 5. The negative pressure in the first inlet 12*a* or in the suction chambers 21, respectively, is preferably situated in a range of values from 200 Pa to 1,500 Pa. The precise value is highly dependent on the surface shape of the outer side 31*a*, i.e., on the camber of the engine nacelle 20 or of the wing.

The flow control device 1 employs a suction device 6 provided in the form of a suction jet pump for generating the negative pressure, with ram air being sucked in from the region of the stagnation point of the engine nacelle 20 via the air intake consisting of the opening 7 and the ram fluid feed line 11 to thereby operate the suction device 6. In consequence of such an operation of the suction device 6, fluid is sucked in automatically from the boundary layer flow $F_{Grenz}$ through the micro-perforations 2. The suction device 6 is dimensioned such that the flow control device 1 accounts for any conduit friction losses and entry and exit losses in order to realize a required extraction velocity for influencing the flow around the flow body and in particular for a laminarized boundary layer flow $F_{Grenz}$ on the outside 31*a* of the engine nacelle 20. In other words, the operation of the flow control device 1 is based on the pressure difference between the total pressure at the stagnation point of the engine nacelle 20 and the total pressure prevailing at the intake opening 2. When the aircraft is not stationary, i.e., as soon as a relative movement takes place such as, e.g., during flight states such as takeoff, ascending flight, descending flight, landing, or cruising, different total pressures prevail at the opening 7 in the stagnation point and at the micro-perforations 2. It may thus be ensured in a particularly simple manner that a higher pressure prevails at the opening 7 than at the intake opening 2, with fluid thus being sucked from the boundary layer flow $F_{Grenz}$ on the outside 31*a*. As was mentioned in the foregoing, the connecting passage 5 is connected via the first inlet 12*a* to the suction device 6 and extends at the engine nacelle 20 in the circumferential direction and, e.g., at an angle of 360° about the longitudinal axis A of the nacelle 20. In one practical example embodiment of the invention in its application to an engine nacelle, the connecting passage 5*a* forms a suction conduit having the form of an annular passage that is closed in itself. The connecting passage 5 does, however, not need to be realized to be continuous in a circumferential direction of the engine nacelle 20, but may also be continuous in the circumferential direction in segments thereof.

In a practical example of an embodiment of the invention, an orifice 22 may be provided between each suction chamber 21 and the connecting passage 5. Via the orifice 22 the respective negative pressure required or desired in the suction chambers 21 for extraction is adjusted based on the pressure gradient influenced by the suction device 6. One practical example of an embodiment of the invention may be realized such that the total pressure at the stagnation point of the engine nacelle 20, and accordingly the pressure gradient along the ram fluid feed line 11 to the outlet device 9, will increase with an increasing velocity of the aircraft relative to the fluid of the enveloping flow, such that the generated negative pressure in the suction chambers 21 is directly dependent on the velocity of the aircraft. The orifice 22 is dimensioned in the process of constructing the suction device 1, e.g. with a view to the operation of the aircraft in cruising flight. In this practical example, flight states during landing or takeoff of the aircraft are disregarded in the configuration of the orifice 22, so that dimensioning of the orifice 22 is solely determined by a desired pressure to be present in the suction chambers 21 at the cruising configuration of the aircraft. The orifice 22 on the one hand allows an adjustment of the quantity of the air mass flow flowing through the micro-perforations 2 into the connecting passage 5. On the other hand it is also possible to regulate the direction of the air mass flow in the connecting passage 5 through variations to the orifice 22 which favor a flow of the air mass out of the suction device 6 and into the outlet device 9. Preferably the orifice 22 is set fixedly for the operation of the aircraft. In special applications the orifice 22 may also be realized to be adjustable in flight operation, allowing to vary the size of the openings of the orifice 22.

Figure 4:
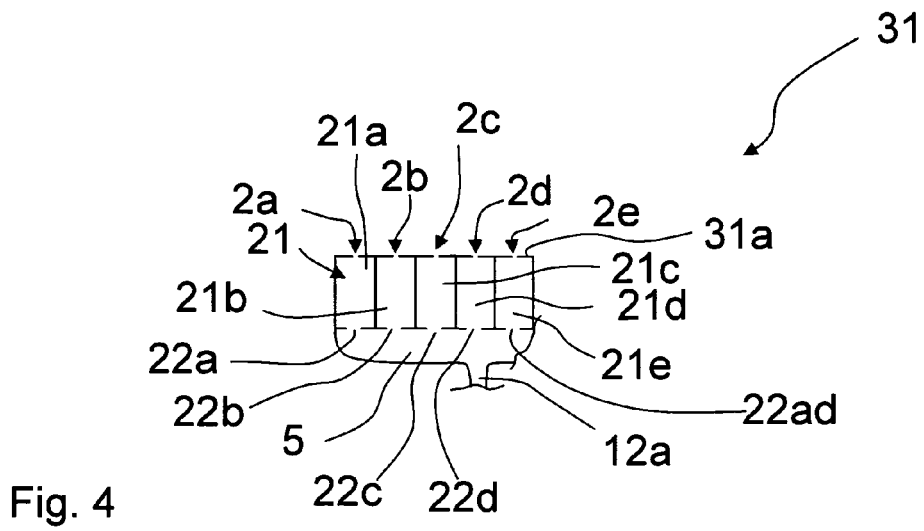
FIG. 4 is a partial sectional view of the outer skin of a flow body in accordance with an embodiment of the invention.

FIG. 4 represents a partial view of the outer shell 31 including the suction chambers 21a, 21b, 21c, 21d, 21e, the respective orifice openings 21a and 21b and 21c and 21d and 21e, and the micro-perforations 2a and 2b and 2c and 2d and 2e.

The suction chambers 21 are formed to be continuous and run along the engine nacelle 20 or substantially in a circumferential direction thereof, and they may extend, e.g., in an angular range of 360 degrees or a partial range thereof about the longitudinal axis A of the engine. In a preferred manner they have a rectangular cross-sectional shape having a width of 10 mm to 40 mm and a height of 10 mm to 13 mm. The width of the suction chamber 21 runs along or substantially in the axial direction of the engine along the longitudinal axis A of the engine nacelle 20, and the height runs along or substantially in a radial direction of the engine nacelle 20 or in the direction of the surface normal in the respective location of the outer side thereof. At a radial end of the suction chamber 21 facing away from the longitudinal axis, each suction chamber 21 is communicated with a region 3 of the outer side 31a wherein a plurality of micro-perforations 2 are present. Air accordingly flows through a multiplicity of micro-perforations 2 into a suction chamber 21, i.e., each suction chamber 21 is communicated with several micro-perforations 2. The orifice 22 is arranged at an end of the suction chamber 21 facing the longitudinal axis A of the engine nacelle 20.

The orifice 22 generally includes orifice openings having an opening diameter that is in a range from 1 mm to 35 mm. According to one practical example of an embodiment of the invention, the size of the orifice openings diminishes in the direction of impinging flow F along the respective flow bodies, i.e., opposite to the longitudinal direction X of the aircraft from nose to tail. A pressure distribution presenting a pressure gradient in the direction of impinging flow F, at which the external pressure prevailing at the micro-perforations 2 decreases in the X-direction of the aircraft, is created along the direction of impinging flow F on the surface of the outer side 31a that is enveloped by a flow of fluid. In order to take account for this gradient, the pressure in the respective suction chamber 21 may be adapted accordingly through appropriate selection of the size of the orifice opening that is associated to one or several perforation opening(s). In particular it may be provided that orifice openings situated at suction chambers having relative downstream positions or corresponding thereto are given a smaller geometrical dimensioning than orifice openings fluidically communicated with suction chambers 21 having relative upstream positions. In some embodiments of the invention, one orifice opening each is associated to one suction chamber 21. Alternatively one suction chamber 21 may have several orifice openings at least in portions thereof. Furthermore one suction chamber 21 may have one perforation opening each or several perforation openings.

Due to the use of a plurality of single suction chambers 21 delimited from each other when viewed in the direction of flow F is advantageous in terms of flow mechanics when compared to an embodiment where the micro-perforations directly conduct the sucked-in air into the common connecting passage 5 which then serves as a collective suction conduit. In the case of the latter structures, the pressure gradient prevailing in the boundary layer $F_{Grenz}$ would cause air in an upstream area of the connecting passage 5 to flow through the micro-perforations 2 into the connecting passage 5 and air in a downstream area to again exit via the micro-perforations from the connecting passage 5 into the boundary layer. This effect, which is undesirable under aspects of flow mechanics, may be suppressed through the structure in accordance with various embodiments the invention.

The micro-perforations 2 are provided in the outer side 31a of the engine nacelle 20 in the form of bores or inlet openings and in particular have a diameter situated in a range from 10 mm to 1000 mm. In special embodiments of the invention, the diameter is situated in a range from 40 mm to 100 mm. These bores are spaced apart from each other, with this distance in particular being situated in a range from 0.1 mm to 2.5 mm, and in some variants of embodiments of the invention in a range from 0.5 mm to 0.9 mm. This magnitude presents the advantage of allowing a sufficient flow through the micro-perforations 2 while the surface of the outer side 31a at the same time presents an aerodynamically favorable, smooth surface.

Figure 5:
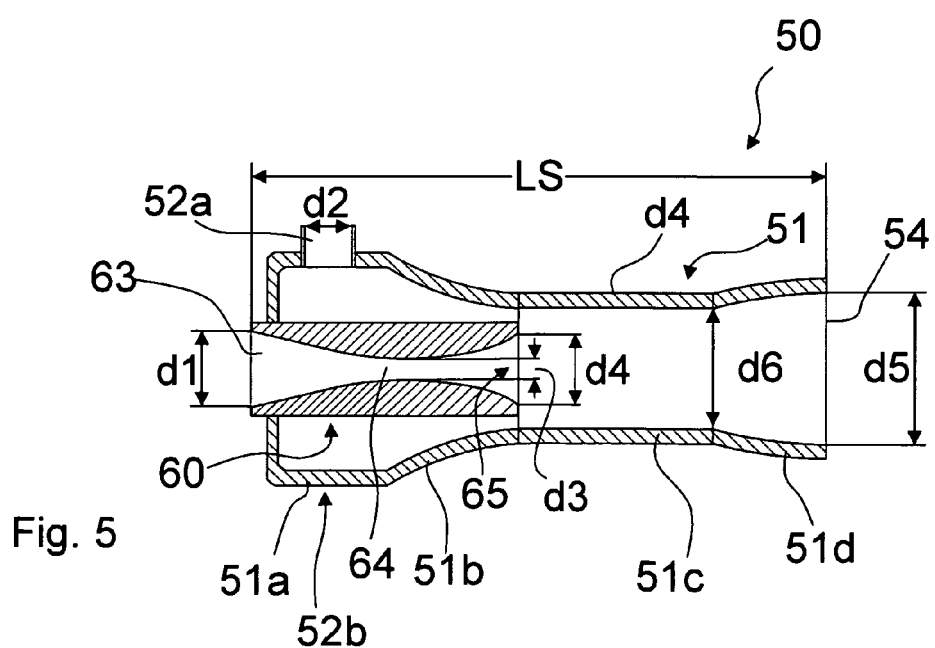
FIG. 5 is a lateral sectional view of a suction device according to one embodiment of the invention.

One embodiment of the suction device 6 is represented in FIG. 5. It presents a suction device housing 51 constituting an evacuation chamber 60 and including the inlet opening 12b, 63, and an outlet opening 54 and a nozzle (60) having an inlet opening (12b, 63) to which the ram fluid feed line (11) is connected. The outlet opening (54) is situated in the prolongation of the longitudinal direction (LD) of the nozzle (60). Moreover the suction device (6) is positioned in the flow body (10) such that the outlet opening (54) is situated in the range between 40% and 60% of the total flow body chord when viewed in the chord direction of the flow body (10).

The outlet device (9) may be connected to the mixing chamber 5 in such a manner and have the form of a diffusor that the latter opens to the interior of the flow body, and that the flow body has in its rear area when viewed in the direction of flow an outlet device through which the air present in the interior (10a) of the flow body may escape to the surroundings of the flow body. The housing 51 preferably includes a first 51a, second 51b, third 51c, and fourth portion 51d. The fourth portion constitutes the outlet device which is configured such that the fluid is allowed to exit from the housing 51 as smoothly as possible. A first part 51a has the form of an evacuation chamber. The second part may have the form of a part of the evacuation chamber including a tapering area. The third housing part 51c may be realized as a pipe having a constant inner diameter.

Inside the nozzle 60, the constriction 64 having the diameter d3 is in particular 30 to 70% of the cross-section of the inlet 63. The diameter d3 of the outlet 65 is in particular between 30 and 70% of the size of the diameter d1.

The position of the outlet opening is in particular situated in a range between 40 and 60% of the camber chord or flow body chord of the flow body 10 altogether.

The length LP of the suction device may in particular be between 500 and 1,000 mm.

Figure 6:
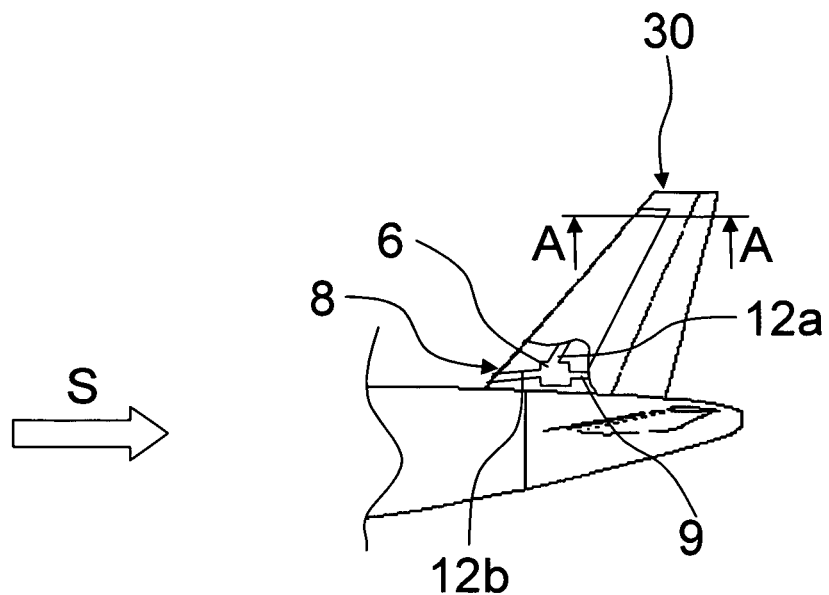
FIG. 6 is a lateral view of a tail part of an aircraft including a vertical tail.
Figure 7:
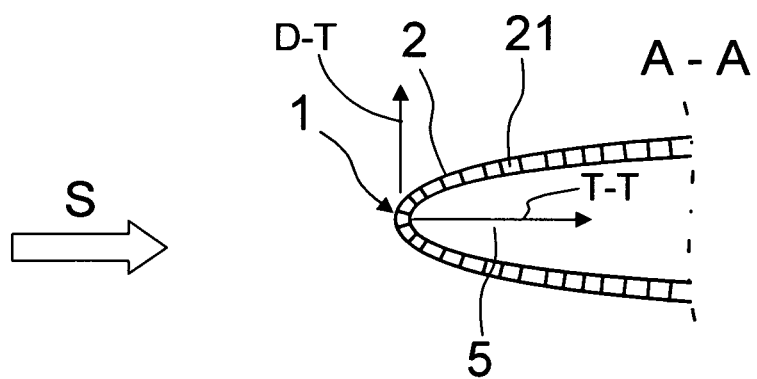
FIG. 7 is a partial sectional view along line A-A in FIG. 4

FIGS. 6 and 7 show further embodiments of the present invention where the flow body is a vertical tail 30. FIG. 5 represents a sectional view of the tail unit 30 along line A-A of FIG. 22. Here the flow control device 1 is arranged on an outer side of the tail unit 30 and below the latter. The function is based on the same physical principle as the one that was explained with regard to the first embodiment of the invention. For the operation of the suction device 6, air from the area of the stagnation point 1—i.e., from the area situated on the leading edge facing the flow—is used, with the embodiment shown in FIG. 22 employing a stagnation point region located at the horizontal tailplane in the area of the fuselage transition 8. Air from the stagnation region along the foremost edge of the tail unit may generally be used as the driving fluid. In this embodiment the connecting passage 5 extends along the spanwise direction of the vertical tail 30, i.e., along the Z-direction of the aircraft. Furthermore the connecting passage 5 extends, in correspondence to the extension of the perforated region, along the direction of flow F in the chord direction of the tail unit.

In the embodiments of the invention, the micro-perforations of the flow control device 1 may be recessed in the respective surface so as to terminate substantially flushly with the contour line of the surface of the outer side 31a and thus form micro-perforated suction panels.

In the embodiments of the invention, the outlet device 9 may have the form of an end diffusor of the suction device 6 by means of which the extracted air and/or the received driving medium is discharged, with this end diffusor being realized with a view to thereby reducing the exit losses.

The dimensions of suction chamber 21, orifice 22, and micro-perforations mentioned with regard to the first embodiment may also be provided for the second embodiment.

In another, alternative embodiment of the invention which is not represented in the figures, the aircraft's airfoils or wings 30" or horizontal tailplane 30' are provided as a flow body within the meaning of the invention. In these embodiments the constructional structure of the second embodiment corresponds to various embodiments of the invention and thus to the representation in FIGS. 2 and 5 with regard to the vertical tail 30. The flow bodies in accordance with various embodiments of the invention may be structural aircraft components extending substantially planarly from the aircraft's fuselage. In the case of these components the fluid flowing along the flow body impinges on the flow body from a direction of impinging flow F. Part of the airflow impinges substantially perpendicularly on an area facing the flow or on a leading edge of the flow body—the stagnation point region—of the flow body. The partial flows passing by laterally substantially envelop the flow body in its flow body-chord direction (e.g., the wing chord direction T-T). The driving fluid for operating the suction devices 6 is drawn in the area of the flow's stagnation points, with the stagnation points being situated in the area of the transitions from the aircraft fuselage to the tail units 30, 30' or to the airfoils 30". In addition or alternatively, openings 7 may also be provided in the area of the leading edges of the tail units 30, 30' or of the wing 30" as inlets for the ram fluid feed line 11. Here the leading edges are the edges situated in the X-direction of the aircraft, i.e. those edges which face the flow in normal flight states of the aircraft.

In accordance with an embodiment of the invention, the flow control device 1 is adapted to a (or the) cruising flight configuration, so that the flow control device 1 consequently does not operate in its optimum range of operation during different flight states such as takeoff, ascending flight, descending flight, and landing. For this reason the flow control device 1 may be adapted to be activated and deactivated. In this case the flow control device 1 may include a closure device realized, e.g., by means of a flap that is disposed at the opening 7 for the ram air supply line and adapted to close or open the latter by driving a corresponding drive device functionally connected thereto. The drive device may in particular be connected to the flight management apparatus detecting or determining the flight states in which the flap is to be open or closed.

Such a flap may serve to interrupt the flow in the ram fluid feed line 11 by closing the opening 7. This prevents driving fluid from arriving in the suction device 6, with no negative pressure being generated in the suction chambers 21 as a result. Alternatively the closure device may also be provided as a throttle valve on the first inlet 12a whereby the inlet 12a may be closed completely. In the closed condition, driving fluid then flows through the ram fluid feed line 11 via the suction device 6 directly into the outlet device 9 without, however, any negative pressure being generated in the connecting passage 5 and the suction chamber 21. The flow control device 1 may be activated or deactivated by taking the ram pressure flap and/or the throttle valve into an opened condition or into a closed condition.

The segments 3, in areas of which the flow control device may be arranged, shall in the following be described by making reference to FIG. 1. The segments 3 are depicted at the airfoils or wings 30" of the aircraft and on the vertical tail 30 and the horizontal tailplane 30'. These segments extend at the surface of the outer side 31a in a chord direction of the tail unit, i.e., in the X-direction relative to the aircraft coordinate system, preferably starting from a leading edge of the tail unit 30 or of the wing 30". In this practical example the segments 3 extend over a range of 5% to 75% of the surface of the tail unit in the tail unit chord direction X. In the spanwise direction Z or Y the segment 3 also extends in a range of 5% to 95% of the surface starting from the stagnation point of the tail unit which is situated on the foremost edge of the tail unit. In general, however, the segments need not start out from the respective leading edge but may also be arranged in a surface area of the wing or tail unit. The segments may in this case extend on the upper side and/or the lower side of the wing or tail unit.

By way of example, FIG. 1 represents engine nacelles 20 having such segments 3 provided with the perforation openings that belong to a flow control device 1. The segments 3 may extend through 360° of the circumference in a circumferential direction of the engine, i.e., around the longitudinal axis A of the engine. In the chord direction of the engine nacelle, i.e. in the X-direction, the respective segment 3 extends over a range of 0% to 50% of the surface of the outer side 31a of the engine nacelle 20. In other words, starting from the stagnation point located at a foremost edge of the engine nacelle, the segment 3 spreads out along the surface of the outer side 31a in the direction of the engine's longitudinal axis, i.e., in the thickness direction X of the engine nacelle.

The outlet device for discharging the fluid sucked in by the suction device may generally be arranged on one surface of the aircraft or of the respective flow body that faces away from the flow.

The described embodiments of the present invention and their features may be combined with each other in part or as a whole.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A flow body, comprising an outer shell having a ram air region and an enveloping flow region which result from a presence of a predetermined flow of a fluid enveloping the flow body in a direction of impinging flow, wherein the enveloping flow region is located to a rear of the ram air region at least during cruise conditions and when viewed in the direction of flow, and at least one flow control device comprising:
   a plurality of micro-perforations penetrating the outer shell, which are arranged in at least one segment of the outer shell that is situated in the enveloping flow region;

a plurality of suction chambers each adjoining an inside of the flow body at the outer shell thereof, wherein upper walls of the plurality of suction chambers are each part of or adjoin an outer skin such that the micro-perforations extend inside the suction chambers, and lower walls of the plurality of suction chambers each present at least one orifice opening or a valve passage, with sidewalls of the plurality of suction chambers delimiting inner spaces thereof from each other, at least one connecting passage which is situated below the suction chambers when viewed in a thickness direction of the flow body, at least one suction device connected to the connecting passage and including a first inlet opening for drawing in fluid having entered through the micro-perforations, which is communicated with the connecting passage, wherein the flow control device additionally comprises a ram fluid feed line which includes a ram fluid inlet opening situated in the ram air region, and the suction device comprises a suction device housing forming an evacuation chamber and including the first inlet opening and an outlet opening, and a nozzle including an inlet opening to which the ram fluid feed line is connected, wherein the outlet opening is situated in a prolongation of a longitudinal direction of the nozzle, and wherein the suction device is positioned in the flow body such that the outlet opening, when viewed in a chord direction of the flow body, is situated in a range between 40% and 60% of an entire flow body chord.

2. The flow body according to claim 1, wherein an entire length of the suction device housing extending in the chord direction of the flow body is between 700 mm and 900 mm.

3. The flow body according to claim 1, wherein the micro-perforations have a diameter of between 10 μm and 1,000 μm.

4. The flow body according to claim 1, wherein a distance between two respective adjacent micro-perforations is between 0.1 mm and 2.5 mm.

5. The flow body according to claim 1, wherein the flow control device is realized such that at the outlet opening of the suction device housing a fluid mass flow is present at which a fluid pressure at the outlet opening is lowered to an ambient pressure of the flow body in a respective operational condition or to a negative pressure prevailing at an outer side thereof at a same chord position of the flow body, with a respective deviation of 20% at the most.

6. The flow body according to claim 1, wherein the ram fluid feed line merges into the flow body at an opening, with the opening being arranged on an outside of the flow body such that a stagnation point of the flow body is situated within the opening when viewed in the direction of flow.

7. The flow body according to claim 1, wherein the flow body has in its rear area, when viewed in the direction of flow, an outlet device through which air present in an interior of the flow body may escape to surroundings of the flow body, and wherein the outlet device is connected to a mixing chamber and has a form of a diffusor configured to open on the interior of the flow body.

8. The flow body according to claim 1, wherein the flow body is an engine nacelle having a substantially cylindrical external configuration, with a longitudinal axis of the engine nacelle running substantially in parallel with the direction of impinging flow of the fluid, and/or the connecting passage extending around the longitudinal axis in a circumferential direction.

9. The flow body according to claim 8, wherein the segment in an outer side having the flow control device arranged therein extends at least partly in the circumferential direction and extends in a longitudinal direction of the engine nacelle over a range of 0% to 50% of a surface starting from a stagnation point of the engine nacelle.

10. The flow body according to claim 1, wherein the flow body is part of an airframe having an airframe chord direction, an airframe spanwise direction, and an airframe thickness direction, with the connecting passage extending along the airframe spanwise direction.

11. The flow body according to claim 10, wherein the segment in an outer side having the flow control device arranged therein extends at least partly in the airframe spanwise direction and extends in the airframe chord direction over a range of 0% to 75% of a surface starting from a stagnation point of the airframe.

12. The flow body according to claim 1, wherein
the flow body is part of an airframe,
the suction device housing comprises two inlet openings arranged so as to face each other, and
the flow body comprises the outer shell having a first and a second enveloping flow region and the ram air region is situated between these, with outer sides of the first and second enveloping flow regions being situated opposite to each other.

* * * * *